United States Patent
Garland et al.

(10) Patent No.: US 6,453,026 B1
(45) Date of Patent: Sep. 17, 2002

(54) TELECOMMUNICATIONS NETWORK ARCHITECTURE FOR ACCESSING CUSTOMER PREMISES EQUIPMENT

(75) Inventors: Stuart Mandel Garland, Morton Grove; William Alan Hewitt, Oswego, both of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/425,152

(22) Filed: Oct. 21, 1999

(51) Int. Cl.[7] ............................................. H04M 11/00
(52) U.S. Cl. ................................. 379/106.03; 379/90.01
(58) Field of Search ....................... 379/106.03, 106.09, 379/106.01, 90.01; 340/870.02, 870.01; 370/352–356

(56) References Cited

U.S. PATENT DOCUMENTS

| | | | | |
|---|---|---|---|---|
| 5,535,267 A | * | 7/1996 | Schull | 379/106 |
| 5,841,845 A | * | 11/1998 | Garland et al. | 379/106.01 |
| 6,044,403 A | * | 3/2000 | Gerszberg et al. | 709/225 |
| 6,167,042 A | * | 12/2000 | Garland et al. | 379/106.09 |

* cited by examiner

Primary Examiner—Stella Woo
(74) Attorney, Agent, or Firm—Werner Ulrich

(57) ABSTRACT

An architecture for communicating with telemetering interface units (TIUs). The system comprises an application controller which interfaces with service vendors who make requests for telemetering metering actions and/or control actions; or network server for communicating via UTTs, (Utility Telemetry Trunks), with an end office switch for accessing TIUs, using a suppressed ringing connection to distinguish between telemetering connections and telephone connections; a service control point (SCP), for providing data about the telecommunications network, the data being necessary in order to allow the network server to access the correct TIU, and a data network for interconnecting the application controller, network server and switching control point. Advantageously, using this arrangement, the functions of the application controller which interfaces with the service vendor are segregated from the functions for controlling the telecommunication network to access the TIU. Both the application controller and the network server are simple computers, such as personal computers (PCs), thus providing a cost effective and inexpensive arrangement.

7 Claims, 5 Drawing Sheets

TELECOMMUNICATIONS NETWORK ARCHITECTURE FOR ACCESSING CUSTOMER PREMISES EQUIPMENT

TECHNICAL FIELD

This invention relates to a new telecommunications network architecture for accessing customer premises equipment, and more particularly, for accessing such equipment from a server to the customer premises equipment for receiving or supplying data at, or from customer premises devices.

Problem

The best known arrangement for using the telecommunications network to access customer premises equipment other than communications equipment, is the arrangement for remote reading of customer meters or for remote control of customer devices, such as the "on-off" switch of an air conditioner. Such arrangements which are described, for example, in S. M. Garland: U.S. Pat. No. 5,189,694 issued Feb. 23, 1993, use a server system for requesting establishment of a connection to a particular customer telephone; the switch then establishes a suppressed ringing connection, so that for example, a query of a customer electric meter to a telemetering interface unit for interfacing with meters and device controllers, does not disturb the customer, and is not affected by features, (such as call forwarding or call waiting), assigned to the line.

The arrangement as presently implemented has a number of disadvantages. First, it requires that the server which may belong for example, to a utility, have knowledge of the directory number of the called telemetering interface unit and further, have knowledge of which switch and, where appropriate, which digital loop carrier (DLC), serves that telephone number. The latter is an especially difficult requirement in the face of local number portability, wherein customers who make relatively local moves are allowed to retain their telephone number even if they are now served by a different switch. Second, the server system which is under the control of the application server vendor, needs to know specialized information about the called customer's telephone service; for example, if the called customer is served via a remotely located subscriber loop carrier system, then the suppressed ringing signal must be preceded by an initial short burst of ringing in order to allow a connection to be completed through the subscriber loop carrier. In summary, the system requires that the vendor's server maintain up-to-date knowledge of the individual data for each telemetering interface unit with which it communicates. Further, if there are a plurality of application servers that communicate with a particular telemetering interface unit (TIU), each of these servers must maintain this information.

Solution

The above problem is solved, and an advance is made over the teachings of the prior art in accordance with this invention, wherein an application server unit, (which is normally owned and controlled by an application server vendor), is replaced by an application controller unit, (normally owned by a server vendor), and a separate network server, owned and operated by the telecommunications carrier. Advantageously, this permits a server vendor to control all vendor functions, and a telecommunications carrier to control all telecommunications functions.

In accordance with one preferred embodiment of the invention, the application controller and the network server are interconnected by a data network. Advantageously, this permits a plurality of application servers to be connected to a single network server, and permits a single application controller to be connected to a plurality of network servers.

In accordance with one preferred embodiment of the invention, a network database such as a Service Control Point (SCP), a database and logic control unit used in the Public Switched Telephone Network (PSTN), is further connected to the data network to allow the network server and the application controller to access the data that is normally stored and maintained in such a service control point. Advantageously, this scheme allows the arrangements used for providing the data required to establish telephone calls to be used for establishing connections between application vendors and customer premises equipment, such as telemetering interface units.

In accordance with one preferred embodiment of the invention, a network connection is established over a Utility Telemetry Trunk, (UTT and the customer's line, between the network server and the telephone interface unit (TIU). The network connection is a suppressed ring connection, which allows such a connection to be established without unnecessarily alerting, (and thereby disturbing), the customer who owns the TIU. The establishment of the connection is under the control of the application controller which sends control packets to the network server. In addition, the application controller sends payload packets containing data to be sent to the telemetry interface unit, and receives payload packets sent by the telemetry interface unit back to the network server over the suppressed ringing circuit connection.

DETAILED DESCRIPTION

Figure 1:
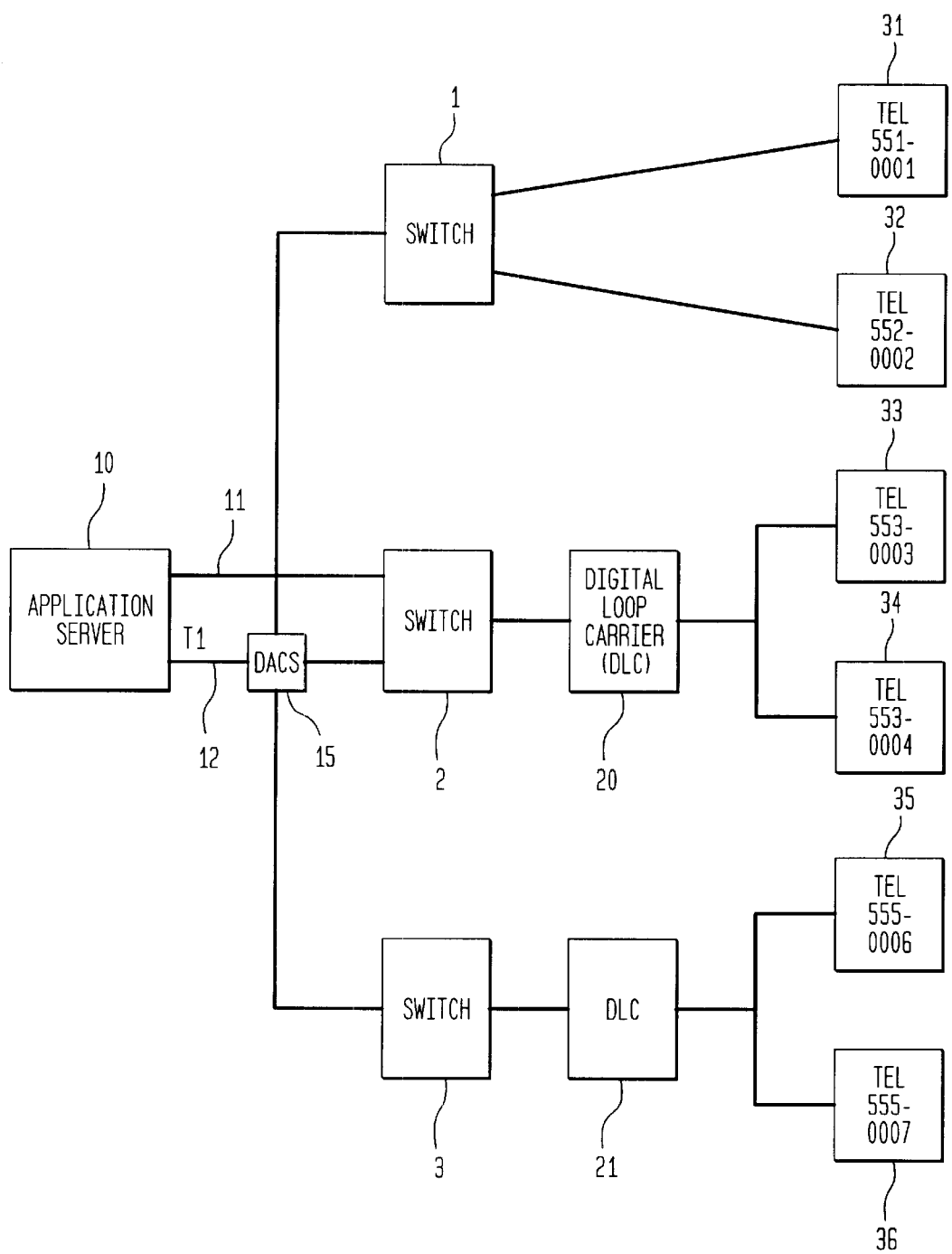
FIG. 1 is a block diagram, illustrating the prior art architecture.

FIG. 1 is a block diagram, illustrating the prior art system. The block diagram shows three switches; one, two and three. Each switch is connected to a plurality of telemetering interface units identified by the telephone number of the customer premises equipment. Thus, switch 1 serves TIUs 31 and 32, having telephone numbers 551–0001, and 552–0002; switch 2 serves telemetering interface units 33 and 34, having telephone numbers 553–0003, and 553–0004, and switch 3 serves telemetering interface units 35 and 36, having telephone numbers 555–0006, and 555–0007. Switch 2 serves TIUs 33 and 34 through a DLC, (sometimes called a subscriber loop carrier (SLC)), which is integrated with switch 2 and which, therefore, does not require using a preliminary short burst of ringing when a suppressed ringing connection is established. Switch 3 serves TIUs 35 and 36 through a remote DLC 21, i.e., a DLC located at a considerable distance from switch 3, and therefore, requires that a suppressed ringing connection be established, using a short a burst of ringing signal, (abbreviated ringing signal), or an open line to establish the connection. In a remote concentrated DLC, a brief burst of ringing, or a line open signal of a specified duration, causes the DLC to assign a time slot to a call, thus allowing a communication path to be established.

All three switches are connected to an application server 10. The application server is connected by a circuit connection, a suppressed ringing connection, to a TIU for the exchange of data between the application server and the TIU. Application Server 10 is connected by a 24 channel T-1 carrier group 11 to switch 2, and is connected by a another T-1 carrier group 12 to a digital access and cross-connect system, (DACS) 15, which distributes individual channels 16, 17, and 18 of a T-1 carrier system to switches 1, 2, and 3, respectively, or to individually connected analog trunks.

Note that the application server is directly connected by trunks to the various switches serving the TIUs of the service vendor who owns the application server. An economic choice must be made between having a small number of application servers and a large number of long trunks for connecting that server to many switches, and having many application servers, and relatively short trunks. The application server can, of course, be controlled by a centralized controller system, (not shown), for generating a request, and for eventually receiving the information returned by the TIUs.

Figure 2:
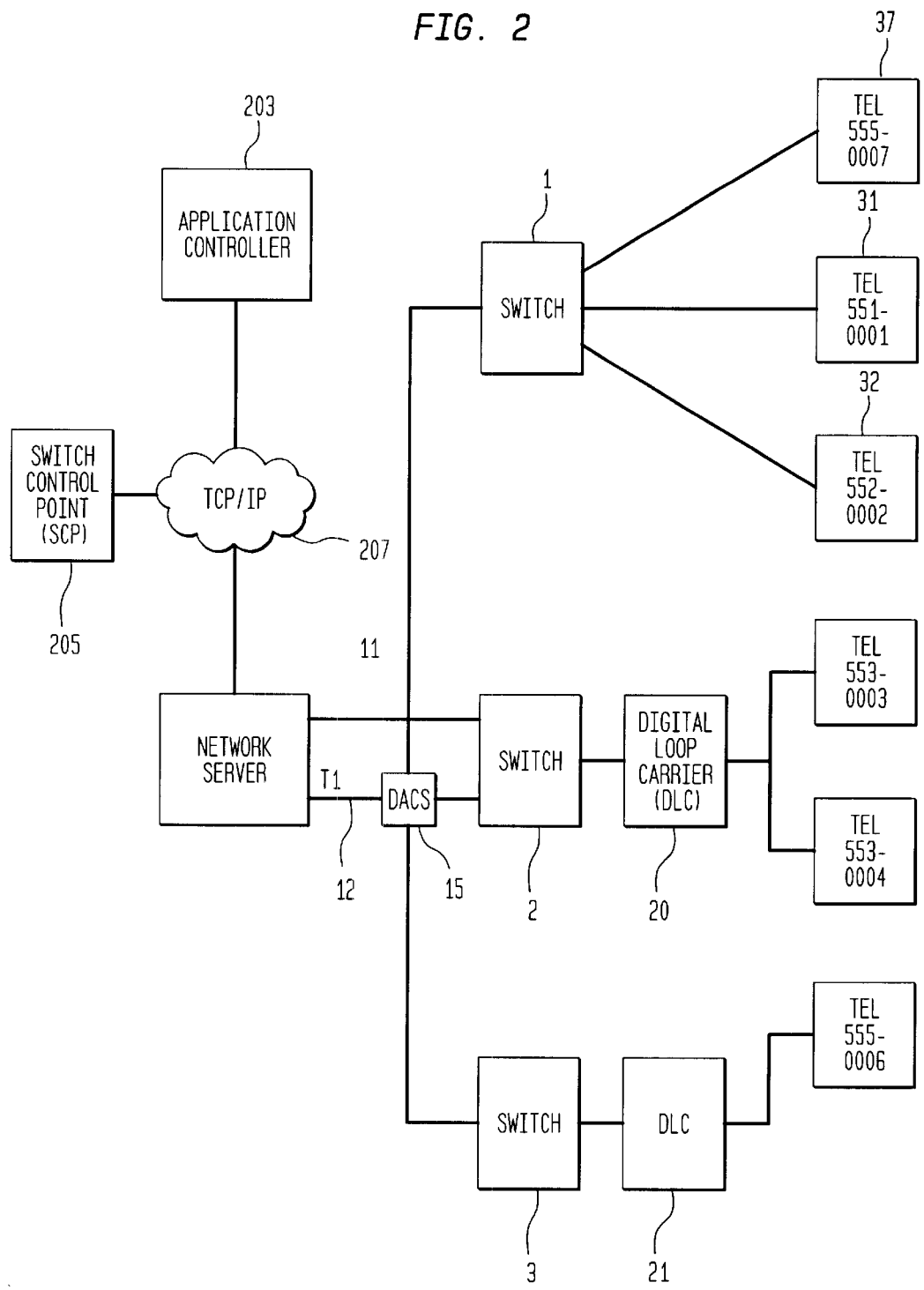
FIG. 2 is a diagram, illustrating the architecture of Applicants' invention.

FIG. 2 shows that instead of an application server, there is a network server 201 having the same connections to the switches and TIUs that application server of FIG. 1 has. In addition, TIU 37 having telephone number 555–0007, which was earlier served by Switch 3, is now served by switch 1; this is now possible because of local number portability, (presumably, the customer having TIU 37, has moved from the area served by switch 3, to the area served by switch 1), and because the architecture of Applicants' invention allows for local number portability. With the earlier architecture, an attempt to connect the application server to telephone 555–0007, presumably on Switch 3, would receive intercept treatment, since that telephone number no longer resides on Switch 3. The network server is owned by the telecommunications carrier, and has access to the network database, which, in this preferred embodiment, is a Service Control Point (SCP) 205, via a data network 207. In Applicants' preferred embodiment, this data network is an Internet Protocol (IP) network, and the protocol used for the data messages between units interconnected by network 207 is TCP/IP (Transmission Control Protoco/Internet Protocol). The network server 201 receives instructions as to which TIUs are to be accessed from an application controller 203, and receives from that controller the contents of payload packets to be transmitted to that TIU. The network server, in turn, transmits to applications controller 203, via data network 207, any payload packets returned by the TIU to which the network server was connected.

The network server accesses information as to which switch controls a particular TIU from SCP 205. SCP 205 also provides information as to whether an abbreviated ringing signal, suppressed ringing connection, is required so that the network server 201 can provide the correct trunk signals. In addition, the SCP contains information to translate between, for example, an account number or street address, and a telephone number for accessing the meter associated with an account. The SCP also provides to the Application Server, the IP address of the Network Server 201.

The network server 201 is similar in structure to the application controller 10. However, the network server 201 does not contain the application software which, in contrast to the prior art configuration of FIG. 1, has now been moved to application controller 203. However, the network server 201 has been enhanced to include software for accessing the data from SCP 205, and to send and receive data via data network 207, to and from application controller 203. Application controller 203 is a computer, possibly a personal computer (PC), equipped with a data communication port for communicating with data network 207. Network server 201 is another computer, possibly a PC, equipped with a port for communicating with data network 207, and T-1 carrier ports for communicating with the switches.

In accordance with the principles of this invention, the application controller has the following functions. It provides separate communications, front-end control from its application code. This allows many applications to be provided using a single communications packet. It stores the directory number data and application data in a form that the application provider needs. It communicates with a network server to send and receive information to and from the TIU. The network server provides the following functions. It places suppressed ringing calls. It sends and receives data to and from the customer premises equipment. It provides the message dialog necessary to set up service to the CPE. It communicates with the SCP to obtain network parameters. It communicates with the application controller to set up calls, transmit data, and tear down calls. It provides automated network routing based on information received from the SCP. It provides local loop access parameters, (e.g., abbreviated ringing, or open end trunk group), to the switch based on information obtained from the SCP.

Figure 3:
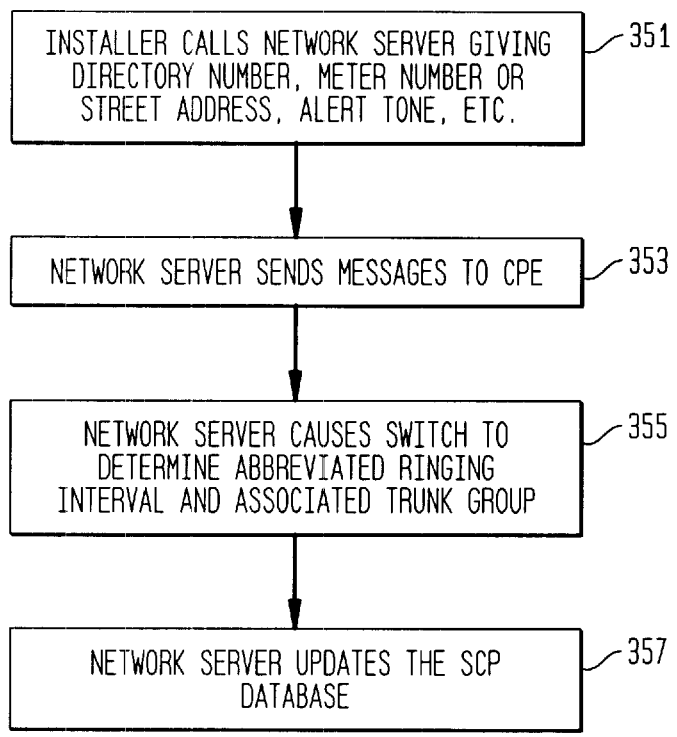
FIG. 3 is a flow diagram, illustrating the establishment of a connection in accordance with the principals of Applicants' invention.

FIG. 3 presents a preferred method of populating the SCP database. At the time of installation, the installer calls the network server giving the directory number, meter number, and other information such as the street address, and any special alerting tone, (Action Block 351). The network server then sends messages to the CPE, (Action Block 353). The network server causes the switch to determine any abbreviated ringing interval and associated trunk group, (Action Block 355). The network server receives information from the switch regarding the abbreviated ringing interval, and associated trunk group, (Action Block 357). The network server then updates the SCP database. (Note that the SCP already knows the point code of the customer's directory number).

Figure 4:
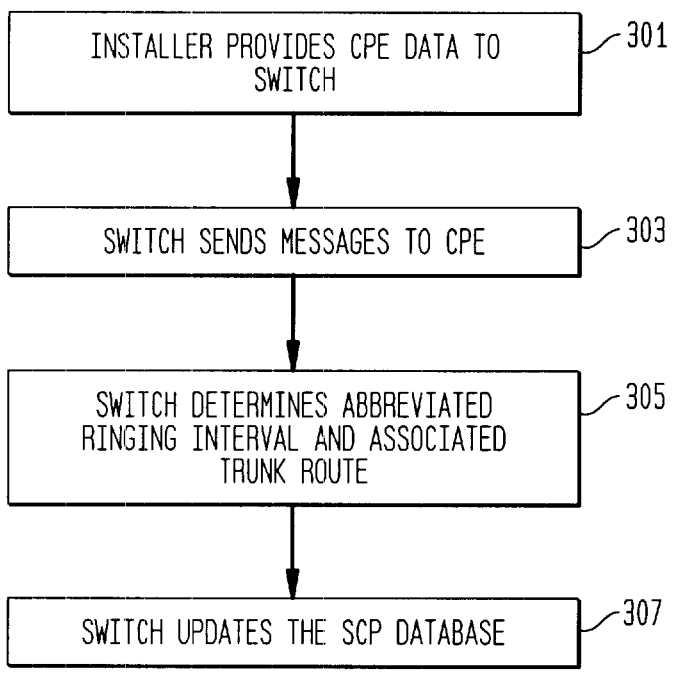
FIG. 4 illustrates an alternate process of building the database in the SCP.

FIG. 4 illustrates an alternate process of building the database in the SCP. When the CPE is installed, the installer provides CPE data to the switch. This CPE data can include, for example, a meter number or street address, or the type of alerting tone or other alerting signal to be used with the CPE. The switch will know the directory number from the identification of the line over which this information is received or if necessary, will cause the network operator to assign a directory number to this line, (Action Block 301). The switch will then attempt to send messages to the CPE in order to determine the minimum allowable ringing interval. If no digital loop carrier is involved between the switch and the CPE, this minimum is zero. Otherwise, the switch will try the various intervals allowed for the primary trunk group, and if necessary, will try intervals allowed only for a secondary trunk group, (Action Block 305). The switch will then update the SCP database by sending its collected information and its own identity, (point code), so that the SCP will have complete information, (Action Block 307). Subsequently, when the network server is asked to establish a connection, if the network server can then access the SCP to get all required parameters, based on the meter number or address that the application controller provides, in order to establish the requested connection.

Figure 5:
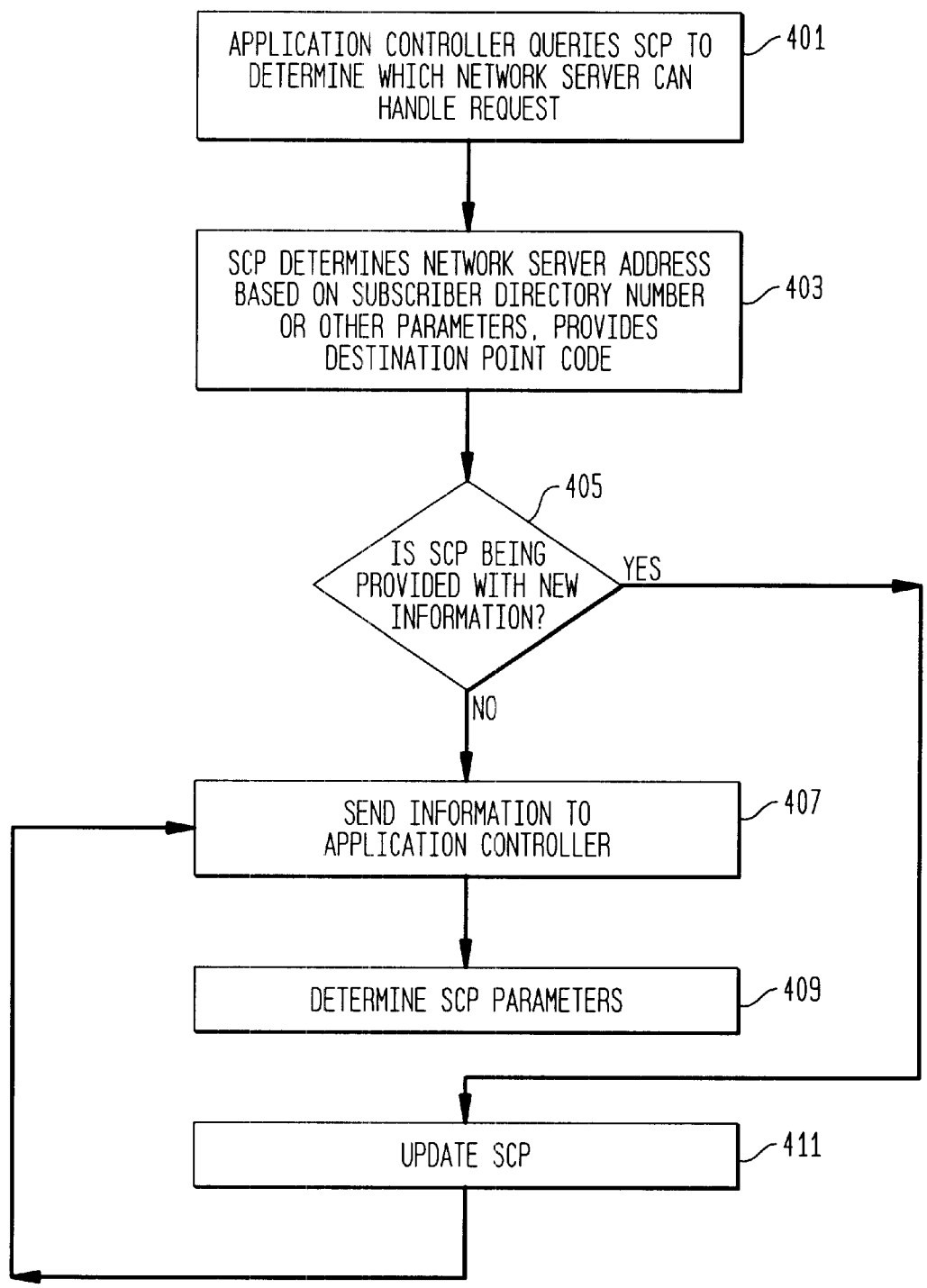
FIG. 5 illustrates the process whereby an application controller determines which network service will handle a specific request.

FIG. 5 illustrates the process whereby an application controller determines which network server will handle a specific request. The application controller queries the SCP, (Action Block 401). The SCP determines the network server address based on the subscriber directory number or other parameter, (such as street address), and provides the address of the network server serving the destination CPE, (Action Block 403). The SCP then tests whether the request from the application controller contains any information not in its current database, but required by the SCP, (Test 405). If not, then the required information for the call is sent from the SCP to the application controller, (Action Block 407). If the SCP is provided with information not in its current database, then the parameters associated with this new information are determined, (Action Block 409), and the SCP is updated with these new parameters, (Action Block 411). Thereafter, the information is sent from the SCP to the application controller, (Action Block 407, previously described).

Figure 6:
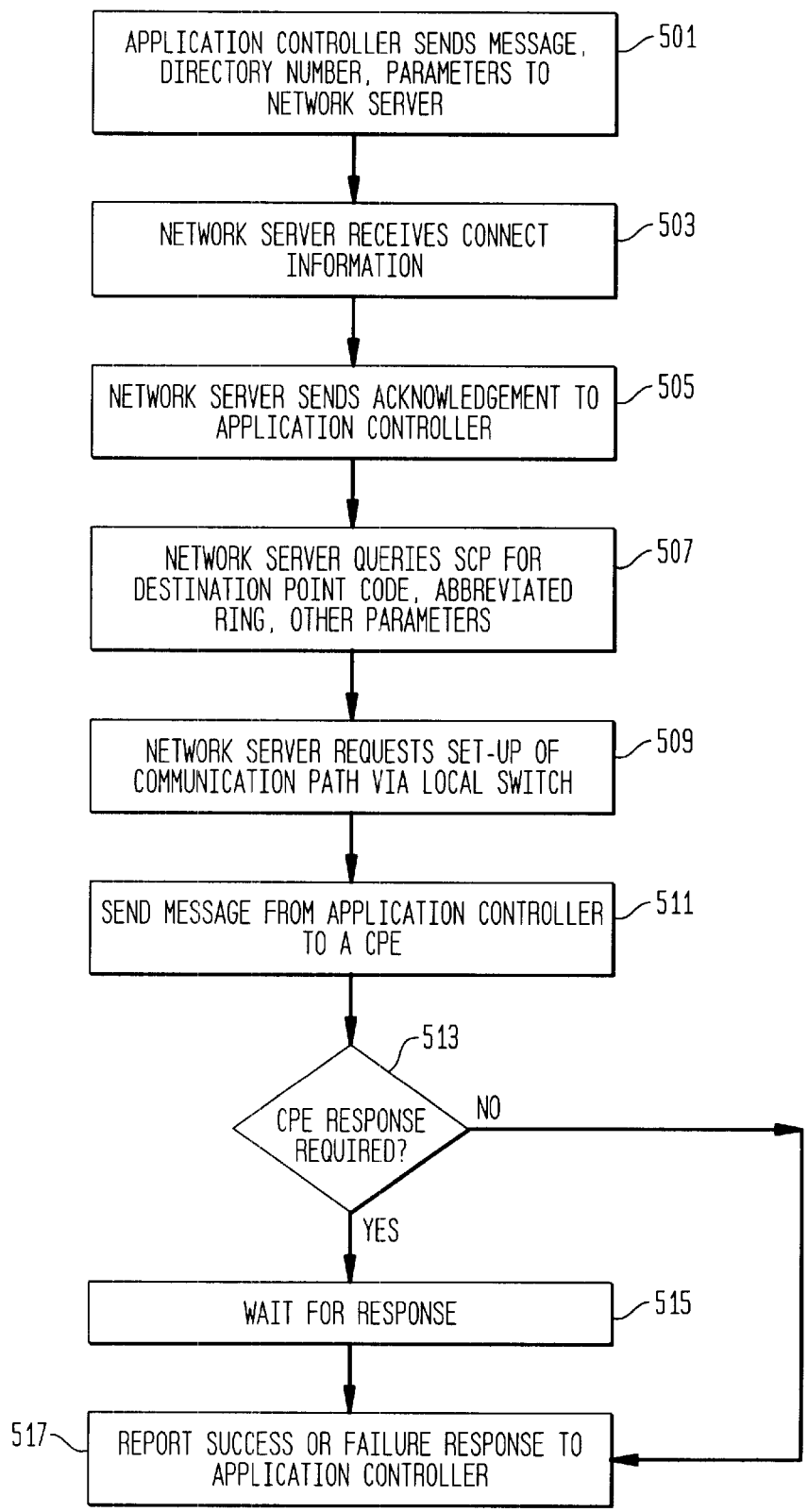
FIG. 6. illustrates the communications between the application controller and the CPE.

FIG. 6 illustrates the communications between the application controller and the CPE. The application controller sends message content, directory number, and/or additional parameters, to the network server, (Action Block 501). The network server receives this information and determines whether it has adequate information to make a connection, (Action Block 503). The network server sends an acknowledgment to the application controller if the information is satisfactory, (Action Block 505), or sends a negative acknowledgment if the information is not satisfactory, which negative acknowledgment terminates this particular process. If a positive acknowledgment had been sent, then the network server queries the SCP for information about the destination point code of the switch that serves the called CPE, as well as abbreviated ring and other parameters provided by the SCP, (Action Block 507). After having received the response from the SCP, the network server sets up a communication path via the local switch identified by the point code, (Action Block 509). The network server then sends the message received from the application controller to the CPE, (Action Block 511). Test 513 determines whether the CPE is expected to respond to the message. If so, then the network server waits for the response, (Action Block 515). Thereafter, or if no response was required, the network server reports a success, or in case of a failure response, a failure to the application controller, and forwards any response to the application controller, (Action Block 517).

The above description is of one preferred embodiment of Applicants' invention. Many other arrangements will be apparent to those of ordinary skill in the art without departing from the scope of the invention. The invention is only limited by the attached Claims.

What is claimed is:

1. Apparatus for connection to a telecommunications network, said telecommunications network for accessing a telemetry interface unit (TIU), the apparatus comprising:

an application controller for interfacing with a service vendor, said application controller connectable to the telecommunications network via a network server;

said network server connectable to the telecommunications network via a plurality of utility telecommunications trunks, (UTT);

said application controller for providing service vendor information to said network server for identifying said TIU;

said network server using said service vendor information to request a connection to said TIU via the telecommunications network;

said application controller for generating data messages to be delivered to said TIU, and for receiving data messages from said TIU.

2. The apparatus of claim 1, further comprising:

a network database for providing data to said application controller to control the process of accessing said TIU.

3. The apparatus of claim 2, wherein said network database, application controller, and network server are interconnected by a data network.

4. The apparatus of claim 3, wherein said network server provides installers with an automated script to determine Customer Premises Equipment (CPE) parameters.

5. The apparatus of claim 3, wherein said network server provides data for automatically updating said network database.

6. The apparatus of claim 3, wherein a switch serving said TIU of a Public Switched Telephone Network (PSTN) provides data for updating said network database.

7. The apparatus of claim 2, wherein said network database is a Service Control Point (SCP).

* * * * *